United States Patent
Byun et al.

(10) Patent No.: US 7,961,671 B2
(45) Date of Patent: Jun. 14, 2011

(54) METHOD OF CONTROLLING CELL COVERAGE AND SYSTEM OF ENABLING THE METHOD

(75) Inventors: Hee Jung Byun, Anyang-si (KR); Mi-Sun Do, Suwon-si (KR); Jung Min So, Suwon-si (KR); Ki-Sun Oh, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 776 days.

(21) Appl. No.: 12/019,803

(22) Filed: Jan. 25, 2008

(65) Prior Publication Data

US 2009/0067339 A1     Mar. 12, 2009

(30) Foreign Application Priority Data

Sep. 10, 2007 (KR) .................. 10-2007-0091769

(51) Int. Cl.
*H04W 4/00*     (2009.01)
(52) U.S. Cl. ....................................... 370/328; 455/561
(58) Field of Classification Search .................. 370/252, 370/328, 329, 331, 338, 229; 455/436, 446, 455/453, 561
See application file for complete search history.

(56) References Cited

U.S. PATENT DOCUMENTS

| | | | |
|---|---|---|---|
| 2006/0092889 A1 | 5/2006 | Lyons et al. | |
| 2006/0121855 A1 | 6/2006 | Dillon | |
| 2006/0182074 A1 | 8/2006 | Kubler et al. | |
| 2007/0021151 A1* | 1/2007 | Mori et al. | 455/562.1 |
| 2007/0087751 A1* | 4/2007 | Voyer et al. | 455/436 |
| 2008/0130582 A1* | 6/2008 | Lee et al. | 370/332 |
| 2008/0254798 A1* | 10/2008 | Power et al. | 455/436 |
| 2008/0268850 A1* | 10/2008 | Narasimha et al. | 455/437 |

FOREIGN PATENT DOCUMENTS

| | | |
|---|---|---|
| JP | 2006-101442 A | 4/2006 |
| KR | 10-2004-0048147 A | 6/2004 |
| KR | 10-2007-0061419 A | 6/2007 |

* cited by examiner

*Primary Examiner* — Brian D Nguyen
(74) *Attorney, Agent, or Firm* — NSIP Law

(57) ABSTRACT

A system of controlling a cell coverage is provided. The system includes: a state information generation unit to generate state information by considering at least one of a cell coverage and a traffic load of a target cell; an adjacent state information identification unit to identify adjacent state information which is generated by considering at least one of a cell coverage and a traffic load of an adjacent node, from at least one adjacent node; and a cell coverage control unit to control the cell coverage of the target cell based on the state information and the adjacent state information.

18 Claims, 6 Drawing Sheets

INITIAL STATE

STATE AFTER SIGNIFICANT TIME PASSES

INITIAL STATE WHEN BASE STATION IS ADDED

STATE AFTER SIGNIFICANT TIME PASSES

INITIAL STATE

STATE AFTER SIGNIFICANT TIME PASSES WHEN
BASE STATION IS REMOVED

METHOD OF CONTROLLING CELL COVERAGE AND SYSTEM OF ENABLING THE METHOD

CROSS-REFERENCE TO RELATED APPLICATION

This application claims the benefit of Korean Patent Application No. 2007-0091769, filed on Sep. 10, 2007 in the Korean Intellectual Property Office, the disclosure of which is incorporated herein by reference.

BACKGROUND OF THE INVENTION

1. Field of the Invention

Aspects of the present invention relate to a method and system of controlling a cell coverage of a base station, a relay, and the like, more particularly, to a method and system of controlling a cell coverage of a target cell by itself.

2. Description of the Related Art

Recently, many researches and studies have been conducted to provide a wireless communication service of a high quality and to achieve a data transmission rate of high speed. Particularly, users need to transmit/receive data via a wireless communication technique while they are moving.

To achieve a data transmission rate of high speed in a wireless communication environment, a receiver needs to receive a transmitted signal in a state in which the transmitted signal is not deteriorated. For this, a large number of base stations or relays (this is referred to as 'base station and the like') are established.

Each of the base station and the like have own cell coverage, and when a plurality of base stations are additionally established, various problems, such as unbalanced interference and traffic loads occurring between a plurality of cells, may occur. Accordingly, a new technique which can reduce the interference and evenly distribute the traffic loads to the plurality of cells. Generally, each cell parameter needs to be manually controlled because each base station needs to have its own fixed cell parameters, and thus economic losses due to extra labor, time, and costs may occur. As an example, when a base station is additionally established, a cell parameter needs to be manually established again for each base station to reduce interference occurring between a plurality of cells.

Furthermore, when a high traffic load exists on 'A' base station, and when a low traffic load exists on 'B' base station, there may be a need to manually re-establish a cell coverage for each base station, and this is ineffective.

Therefore, a new method and system which can control a cell coverage in order to optimally acclimate with an adjacent wireless environment is desirable.

SUMMARY OF THE INVENTION

Aspects of the present invention provide a method and system which can effectively control a cell coverage since a cell coverage of a target cell is controlled by considering a cell coverage of an adjacent node.

The present invention also provides a method and system which can evenly distribute a traffic load to each of cells since a cell coverage of a target cell is controlled by considering a traffic load of an adjacent node.

The present invention also provides a method and system which can effectively control a cell coverage since state information being capable of simultaneously considering both the cell coverage and a traffic load is newly defined.

The present invention also provides a method and system which can control a cell coverage since a substantial wireless environment is considered by calculating a traffic load by giving a weighted value to each quality of service (QoS).

According to an aspect of the present invention, there is provided a system of controlling a cell coverage including: a state information generation unit to generate state information by considering at least one of a cell coverage and a traffic load of a target cell; an adjacent state information identification unit to identify adjacent state information which is generated by considering at least one of a cell coverage and a traffic load of an adjacent node, from at least one adjacent node; and a cell coverage control unit to control the cell coverage of the target cell based on the state information and the adjacent state information.

In an aspect of the present invention, the system of controlling the cell coverage may further include: a state information advertisement unit to advertise the state information to the at least one adjacent node by considering the controlled cell coverage of the target cell.

In an aspect of the present invention, the system of controlling the cell coverage may further include: a state information updating unit to update the state information of the target cell by considering the controlled cell coverage of the target cell.

According to another aspect of the present invention, there is provided a method of controlling a cell coverage including: generating state information by considering at least one of a cell coverage and a traffic load of a target cell; identifying adjacent state information which is generated by considering at least one of a cell coverage and a traffic load of an adjacent node, from at least one adjacent node; and controlling the cell coverage of the target cell based on the state information and the adjacent state information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
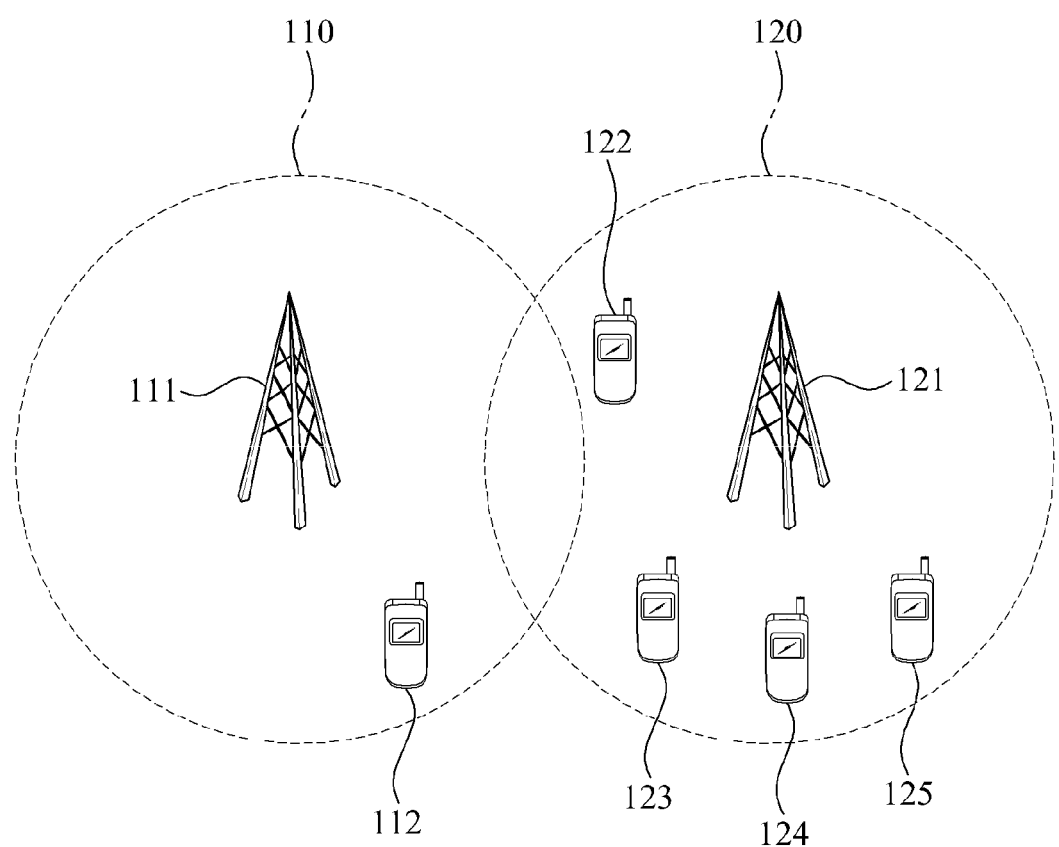
FIG. 1 is a diagram illustrating cell coverage of each of two base stations.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating cell coverage of each of two base stations.

Referring to FIG. 1, a base station 111 includes a cell coverage 110, and another base station 121 includes another cell coverage 120. A mobile terminal 112 is included in the cell coverage 110 of the base station 111, and other mobile terminals 122, 123, 124, and 125 are included in the other cell coverage 120 of the other base station 121.

It is assumed that all mobile terminals 112, 122, 123, 124, and 125 transmit/receive a same amount of data with the base stations 111 and 121 with regards to a same class of quality of service (QoS). In this instance, an amount of a traffic load occurring in the other base station 121 is four times an amount of a traffic load occurring in the base station 111 since a number of the mobile terminal 112 included in the cell coverage 110 is one and a number of the other mobile terminals 122, 123, 124, and 125 included in the other cell coverage 120 are four.

Accordingly, it may be ineffective for the cell coverage 110 of the base station 111 to have a same radius as the other cell coverage 120 of the other base station 121. That is, it may be difficult to transmit/receive data in high speed between the other mobile terminals 122, 123, 124, and 125 included in the other cell coverage 120 of the other base station 121 since comparatively greater traffic load occurs in the other base station 121 in comparison to the base station 111.

If it is possible to control the cell coverages 110 and 120, traffic loads can be effectively distributed. Specifically, a more effective communication system can be configured if the cell coverage 110 is increased, and if the other cell coverage 120 is decreased, so that the cell coverage 110 can include the mobile terminal 122, and the other cell coverage 120 can include the mobile terminals 123, 124, and 125.

Although a subject of having a cell coverage is depicted as a base station in embodiments of the present invention, the spirits of the present invention may be applied to a relay, a mobile terminal having a cell coverage, and any station having a cell coverage, in addition to a base station.

Figure 2:
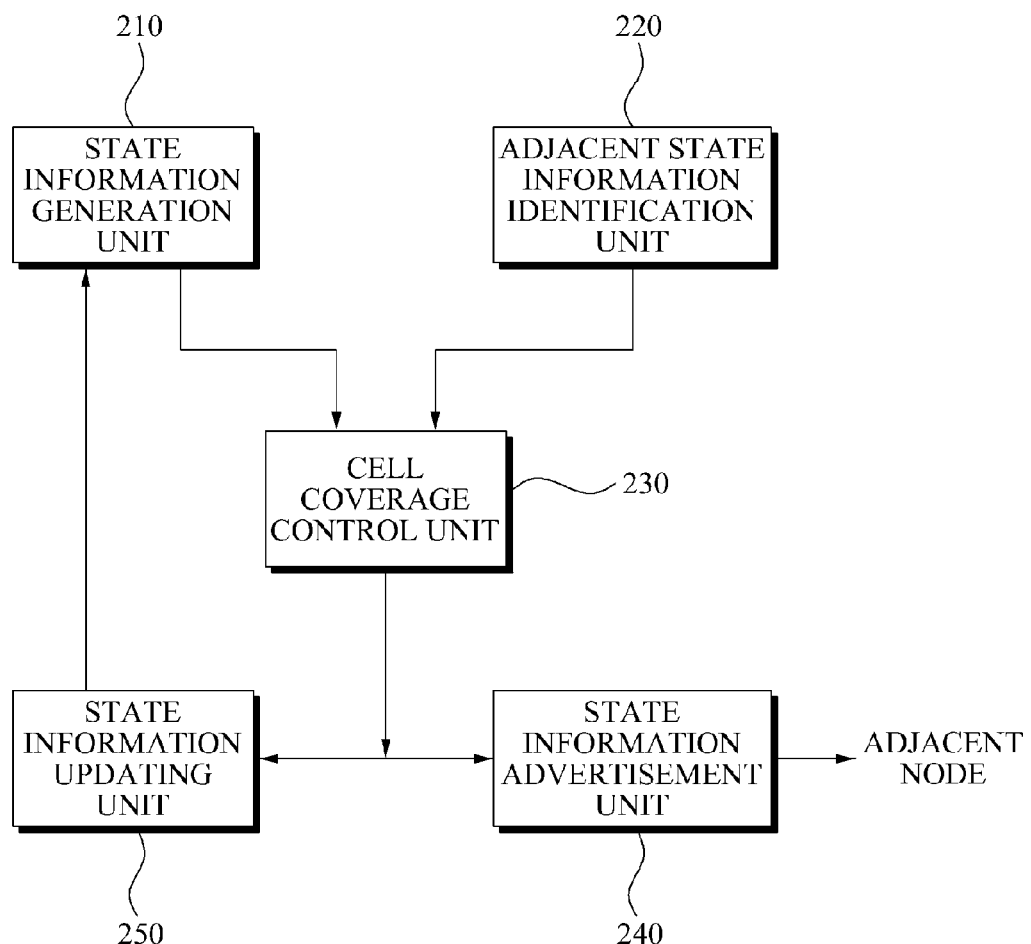
FIG. 2 is a block diagram illustrating a system of controlling a cell coverage according to an embodiment of the present invention.

FIG. 2 is a block diagram illustrating a system of controlling a cell coverage according to an embodiment of the present invention.

Referring to FIG. 2, the system of controlling a cell coverage includes a state information generation unit 210, an adjacent state information identification unit 220, a cell coverage control unit 230, a state information advertisement unit 240, and a state information updating unit 250.

The state information generation unit 210 generates state information by considering at least one of a cell coverage and a traffic load of a target cell.

In this instance, the traffic load may be determined based on an amount of data received in a base station, and may be determined based on a queue length of data which is being buffered in the base station. Also, the traffic load may be calculated by giving a different weighted value to each class of a QoS.

In this instance, a traffic load $F(q_i)$ occurring in an $i^{th}$ cell may be represented by, $$F(q_i) = E\left(w_0 q_i^0 + w_1 q_i^1 + \ldots + w_Q q_i^Q + \frac{N_{MS}}{N_T}\right),$$ [Equation 1]

where $q_i^k$ indicates a queue length with respect to a class k of a QoS in the $i^{th}$ cell, $w_i$ indicates a weighted value with respect to a class i of the QoS, E(x) indicates an exponentially weighted moving average of an x, $N_{MS}$ indicates a number of mobile stations included in a cell coverage, and $N_T$ indicates a number of all stations included in the cell coverage.

Referring to Equation 1, the traffic load $F(q_i)$ may be calculated by giving a different weighted value to each class of a QoS. That is, even when queue lengths of data are identical with each other, a load on each cell can be different depending on each class of a QoS.

In this instance, the system of controlling the cell coverage according to the embodiment of the present invention may give a different weighted value according to each class of a QoS, as described above. Specifically, a high weighted value may be applied to a queue length corresponding to a class of a high QoS.

Also, as a number of mobile terminals included in the cell coverage increases, a number of handover performances may increase, and the number of handover performances may be considered when a traffic load is calculated.

That is, $$\frac{N_{MS}}{N_T}$$

is included in Equation 1 as a calculation factor of the traffic load. Therefore, according to the present invention, a traffic load that conforms to substantial activity can be calculated since a handover is considered as a calculation factor when calculating a traffic load by considering mobility of a mobile terminal.

In this instance, the state information generation unit 210 may generate state information by multiplying cell coverage information associated with the cell coverage of the target cell and traffic information associated with the traffic load, as shown below, $$m_i = C_i \cdot F(q_i)$$ [Equation 2]

Referring to FIG. 2, $m_i$ indicates cell state information of the $i^{th}$ cell, $C_i$ indicates a cell coverage radius of the $i^{th}$ cell, and $F(q_i)$ indicates a traffic load occurring in the $i^{th}$ cell.

In an embodiment of the present invention, a cell coverage radius may be controlled so that $m_i$ can be constant or can not be changed. Specifically, when $F(q_i)$ is increased, that denotes it needs to reduce a present cell coverage radius, when $F(q_i)$ is decreased, that denotes it needs to increase the present cell coverage radius.

Also, the adjacent state information identification unit 220 identifies adjacent state information which is generated by considering at least one of a cell coverage and a traffic load of an adjacent node, from at least one adjacent node.

That is, the adjacent node generates adjacent state information according to the above described operations. In this instance, adjacent nodes may broadcast or multicast adjacent state information, and thereby the adjacent state information identification unit 220 may identify adjacent state information. In this instance, the adjacent state information identification unit 220 may identify adjacent state information corresponding to each adjacent node when more than two adjacent nodes exist.

The cell coverage control unit 230 controls the cell coverage of the target cell based on the state information and the adjacent state information.

In this instance, the cell coverage control unit 230 may control the cell coverage of the target cell to balance the state information and the adjacent state information by using the state information and the adjacent state information. In this instance, the cell coverage control unit 230 may calculate average state information with respect to the state information and the adjacent state information, and control the cell coverage of the target cell by considering the state information based on the calculated average state information.

As an example, it is assumed that state information of a target cell is 10, and state information of an adjacent node is 40. Since a sum of the state information of the target cell and the state information of the adjacent node is 50, and an average value of the two state information is 25, average state information becomes 25. The cell coverage of the target cell needs to be increased since the state information of the target cell is less than the average state information, and the cell coverage of the adjacent node needs to be decreased since the state information of the adjacent node is greater than the average state information. Consequently, the cell coverage of the target cell may be increased until the state information of the target cell becomes balanced with the state information of the adjacent node. Conversely, the cell coverage of the adjacent node may be decreased until the cell coverage of the adjacent node becomes balanced with the cell coverage of the target cell. After a significant time passes, the state information of the target cell, the state information of the adjacent node, and the average state information will be substantially identical.

For reference, an initial value $C_i^0$ of the cell coverage may be variously established, however may be generated via Equation 3 in a worst scenario.

$$C_i^0 = \frac{\min_{j \in J_i} m_{ij}}{F(q_i^T)},$$ [Equation 3]

$$F(q_i^T) = E\left(w_0 q_i^{T_0} + w_1 q_i^{T_1} + \ldots + w_Q q_i^{T_Q}\right).$$

Referring to Equation 3, $J_i$ indicates a set having adjacent nodes as elements, $m_{ij}$ indicates adjacent state information of the adjacent nodes, and $q_i^{T_k}$ indicates a threshold value of a queue length with respect to a class k of a QoS. In this instance, $F(q_i^T)$ may be established as a predetermined value. Consequently, the initial value of cell coverage of the target cell $C_i^0$ may be determined to a comparatively small value according to the worst case.

In this instance, when a difference between the state information and the average state information is greater than or equal to a predetermined level, the cell coverage control unit 230 decreases the cell coverage of the target cell when the state information is a higher level than the average state information, and increases the cell coverage of the target cell when the state information is a lower level than the average state information.

That is, when the difference between the state information and the average state information is great, the cell coverage of the target cell needs to be increased or decreased. In this instance, when the state information is a higher level than the average state information, since a cell coverage of a present target cell is greater than required, the cell coverage of the target cell may be decreased. Conversely, when the state information is a lower level than the average state information, since a cell coverage of a present target cell is less than required, the cell coverage of the target cell may be increased.

In this instance, the cell coverage control unit 230 may control the cell coverage of the target cell by considering a coverage gap occurring between the cell coverage of the target cell and the cell coverage of the adjacent node.

In this instance, the coverage gap may be identified using link quality information such as a carrier and interference noise ratio (CINR) of a mobile terminal. Specifically, when a CINR is less than a predetermined level, a link quality of the mobile terminal is determined to be poor. When a link quality of a specific mobile terminal is determined to be poor, an area around the mobile terminal may be determined to be a coverage gap. If a number of the coverage gap is determined to be great, the cell coverage control unit 230 may increase a cell coverage of a target cell.

In this instance, when the difference between the state information and the average state information is less than a predetermined level, the cell coverage control unit 230 may control the cell coverage of the target cell by considering a number of handover performances of a moving node, which has occurred within the cell coverage of the target cell.

As an example, when the number of handover performance of the moving node, which has occurred within the cell coverage of the target cell is great, the cell coverage of the target cell may be decreased.

In this instance, when an idle node has exists, the cell coverage control unit 230 increases the cell coverage of the target cell by considering state information of the idle node, the idle node being one of the at least one adjacent node.

As an example, one node of a plurality of adjacent nodes may become idle, such as in termination or turn-off. In this instance, the cell coverage control unit 230 may increase the cell coverage of the target cell to compensate for lost cell coverage due to the idle node.

Also, the state information advertisement unit 240 advertises the state information to adjacent nodes by considering the controlled cell coverage of the target cell. Specifically, when a cell coverage radius is controlled from 10 to 20, state information which has considers the controlled radius of the cell coverage may be generated. In this instance, the generated state information is advertised to the adjacent nodes by the state information advertisement unit 240.

Also, the state information updating unit 250 updates the state information of the target cell by considering the controlled cell coverage of the target cell.

Figure 3:
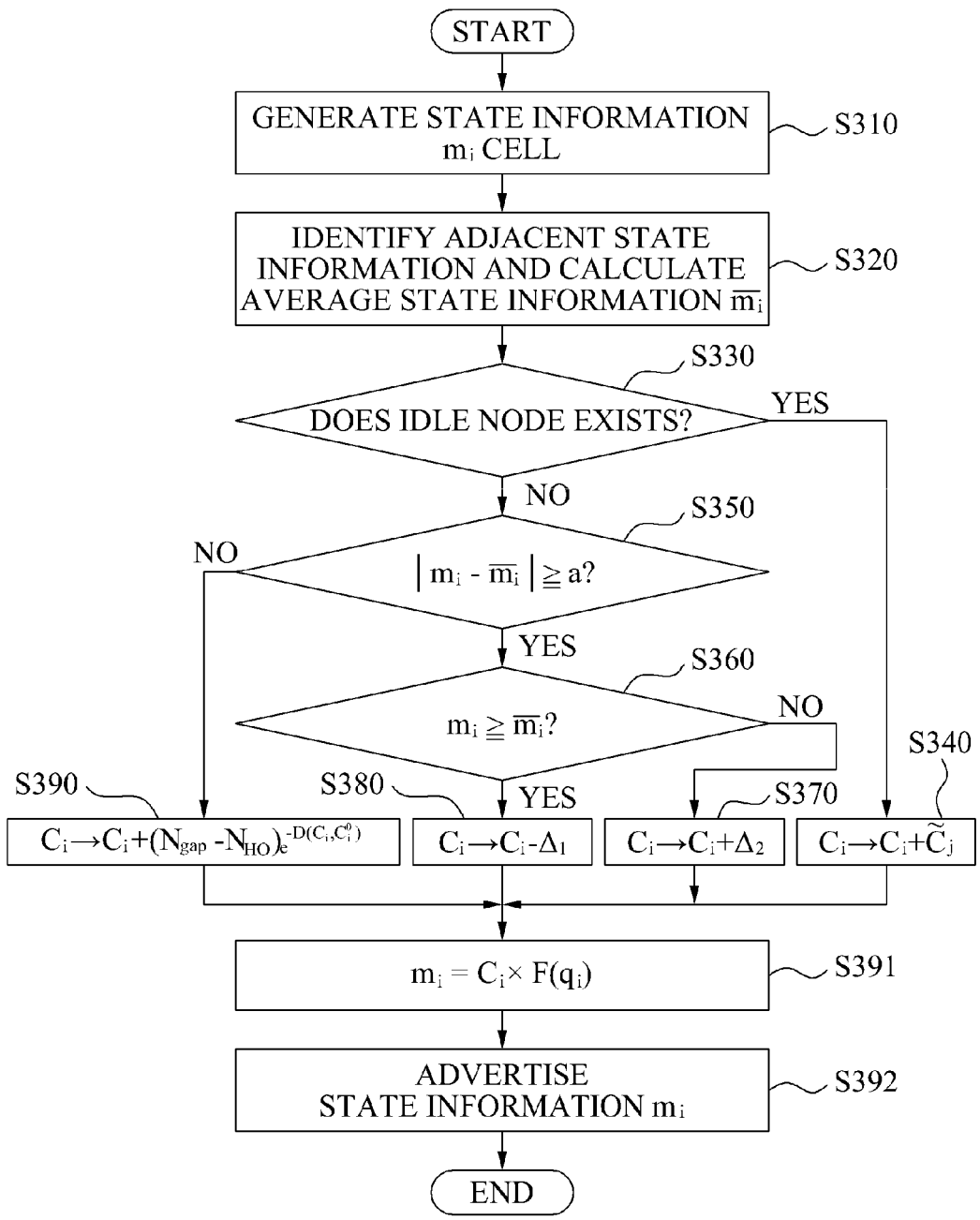
FIG. 3 is a flowchart illustrating a method of controlling a cell coverage according to an embodiment of the present invention.

FIG. 3 is a flowchart illustrating a method of controlling a cell coverage according to an embodiment of the present invention.

Referring to FIG. 3, the method of controlling the cell coverage according to the embodiment of the present invention generates state information $m_i$ by considering at least one of a cell coverage and a traffic load in operation S310.

Also, the method of controlling the cell coverage according to the embodiment of the present invention identifies adjacent state information which is generated by considering at least one of a cell coverage and a traffic load of an adjacent node, from at least one adjacent node, and calculates average state information $\overline{m}_i$ with respect to the state information $m_i$ and the adjacent state information in operation S320.

In operation S330, the method of controlling the cell coverage according to the embodiment of the present invention determines whether an idle node, which is one of the at least one adjacent node, exists In operation S340, when it is determined the idle node of $j^{th}$ node exists, the method of controlling the cell coverage according to the embodiment of the present invention controls the cell coverage radius of the target cell to change from $C_i$ to $C_i + \tilde{C}_j$.

In this instance, $$\tilde{C}_j = \frac{m_j}{F(q_i)}$$

is satisfied, and $m_j$ indicates adjacent state information which is finally informed from the idle node. Accordingly, the cell coverage included in the idle node may be compensated by the cell coverage of the target cell.

In operation S350, when it is determined the idle node does not exist, the method of controlling the cell coverage according to the embodiment of the present invention determines whether a difference between the state information $m_i$ and the average state information $\overline{m}_i$ is greater than or equal to a predetermined level 'a'. In this instance the 'a' may be flexibly established depending on wireless environments.

In operation S360, when it is determined $|m_i-\overline{m}_i| \geq \alpha$, the method of controlling the cell coverage according to the embodiment of the present invention determines whether the state information $m_i$ is greater than or equal to the average state information $\overline{m}_i$.

In operation S380, when it is determined the state information $m_i$ is greater than or equal to the average state information $\overline{m}_i$, the cell coverage radius $C_i$ of a target cell is decreased to $C_i-\Delta_1$. Conversely, in operation S370, when it is determined the state information $m_i$ is less than the average state information $\overline{m}_i$, the cell coverage radius $C_i$ of the target cell is increased to $C_i+\Delta_2$. In this instance, $\Delta_1$ and $\Delta_2$ are greater than zero.

In operation S390, when it is determined $|m_i-\overline{m}_i|<\alpha$, the method of controlling the cell coverage according to the embodiment of the present invention controls the cell coverage radius to be changed from $C_i$ to $C_i+(N_{gap}-N_{HO})e^{-D(C_i-C_i^0)}$.

In this instance, $N_{gap}$ indicates a number of cell coverage gaps occurring between the target cell and the adjacent node, and $N_{HO}$ is a difference between a number of handover performances occurring in the target cell and a predetermined number and which also surpasses the predetermined number. Also, $D(C_i-C_i^0)$ indicates a difference between the cell coverage radius $C_i$ of a present target cell and a cell coverage radius $C_i^0$ of an initial target cell.

Specifically, when $N_{gap}$ is great, the cell coverage radius is increased, and when $N_{HO}$ is great, a cell coverage radius is decreased. Also, when $D(C_i-C_i^0)$ is great, the cell coverage of the target cell is slowly increased or decreased.

In operation S391, the method of controlling the cell coverage according to the embodiment of the present invention updates the state information of the target cell by considering the controlled cell coverage of the target cell.

In operation S392, the method of controlling the cell coverage according to the embodiment of the present invention advertises the state information to the at least one adjacent node by considering the controlled cell coverage of the target cell.

Figure 4:
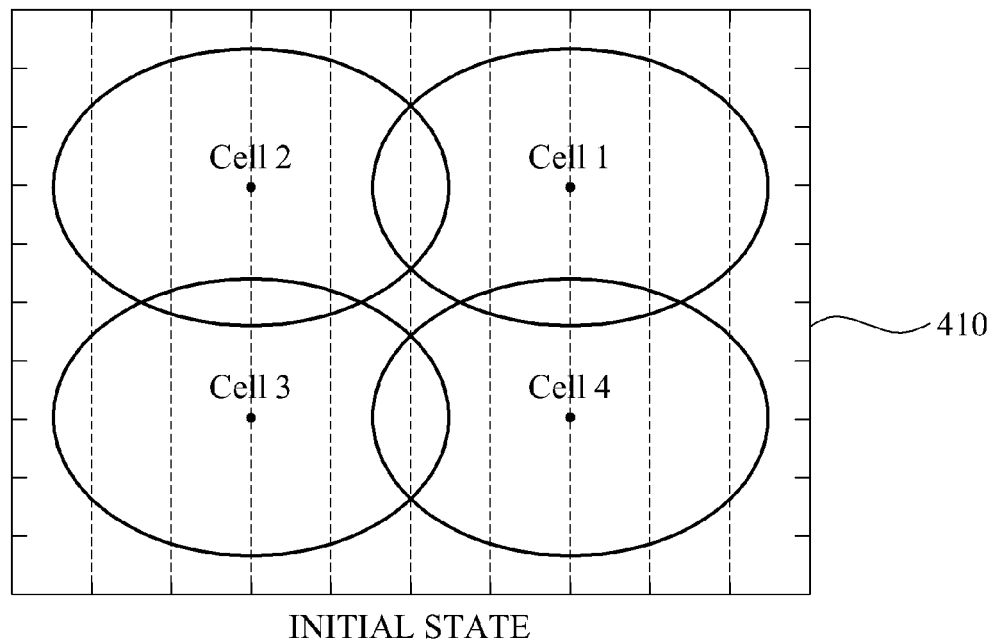
FIG. 4 is a diagram illustrating an example of a result that a cell coverage is controlled according the present invention.
Figure 4:
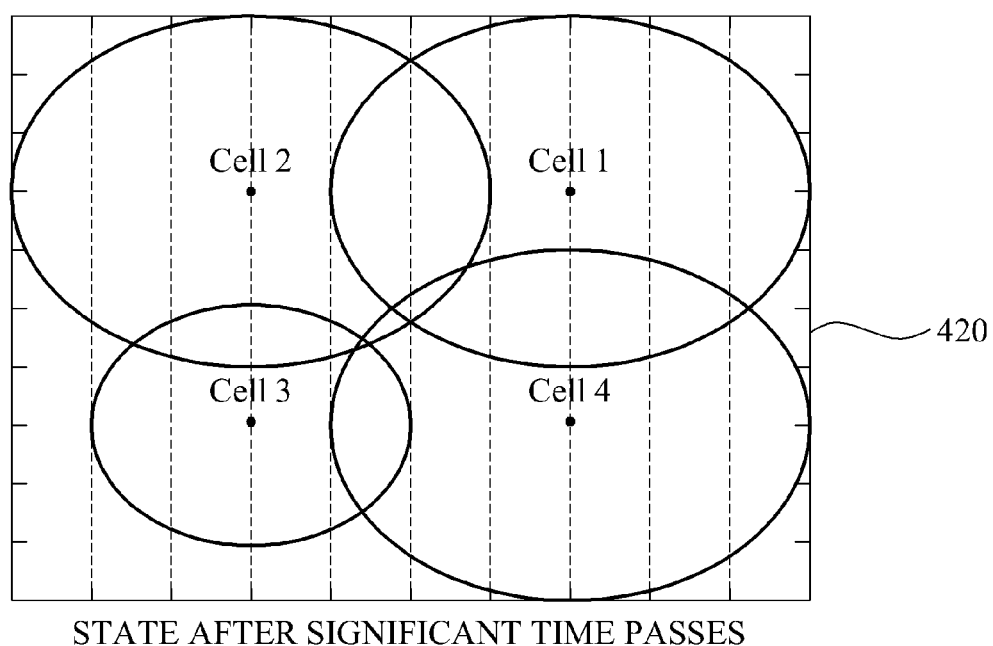

FIG. 4 is a diagram illustrating an example of a result that a cell coverage is controlled according the present invention.

Referring to FIG. 4, a graph 410 depicts a state before cell coverages of cells 1, 2, 3, and 4 are controlled according to the present invention. That is, the cell coverages of cells 1, 2, 3, and 4 are established to be an identical size.

In this instance, another graph 420 depicts a state of cell coverages of cells 1, 2, 3, and 4 after significant time passes after a traffic load occurring in cell 3 is increased. That is, when the traffic occurring cell 3 is increased, a cell coverage of cell 3 is decreased. In this instance, since the decreased cell coverage of cell 3 or the traffic load occurring in cell 3 is considered, cell coverages of cell 1, 2, and 4 are increased.

Consequently, the cell coverages of cells 1, 2, and 4 are increased in comparison to an initial state, and the cell coverage of cell 3 is decreased in comparison to the initial state, and stabilizes after significant time passes.

Figure 5:
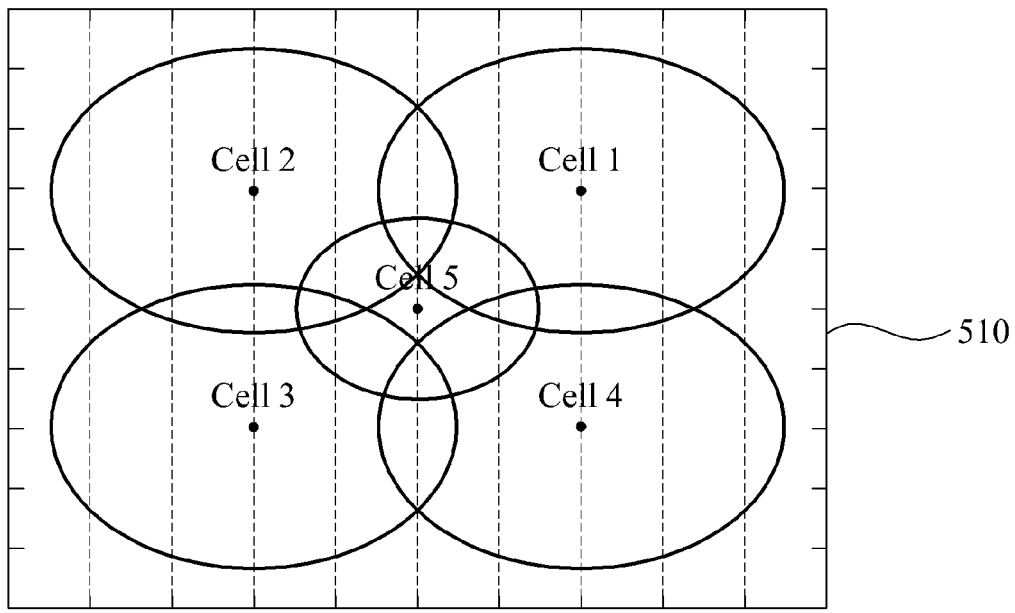
FIG. 5 is a diagram illustrating an example of a result that a cell coverage is controlled when a base station is added according to the present invention.
Figure 5:
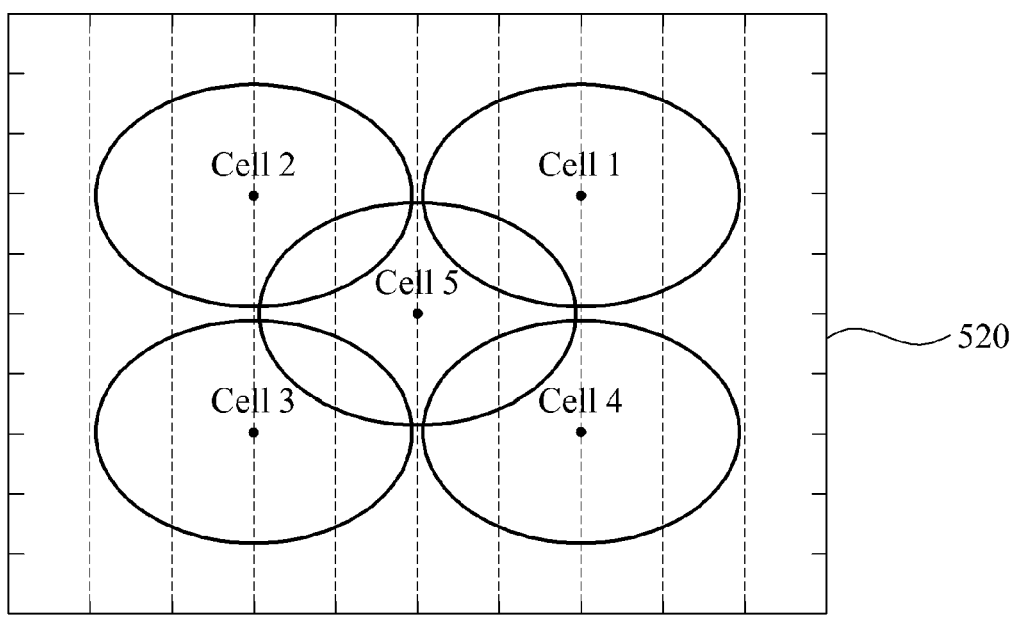

FIG. 5 is a diagram illustrating an example of a result that a cell coverage is controlled when a base station is added according to the present invention.

Referring to FIG. 5, a graph 510 depicts an initial state when cells 1, 2, 3, and 4 are all set, and when a base station corresponding to cell 5 is additionally turned on or activated.

That is, an initial cell coverage of cell 5 may be established via Equation 3. When a base station corresponding to cell 5 is additionally added, each of cells 1, 2, 3, 4, and 5 controls its own cell coverage.

Another graph 520 depicts a state after significant time passes when the base station corresponding to cell 5 is additionally added. If traffic loads occurring in cells 1, 2, 3, 4, and 5 are identical to each other, cell coverages of the cells 1, 2, 3, 4, and 5 are stabilized to have identical cell coverages as illustrated in the other graph 520.

Consequently, the cell coverages of cells 1, 2, 3, and 4 are decreased in comparison to the initial state, and the cell coverage of cell 5 is increased in comparison to the initial state.

Figure 6:
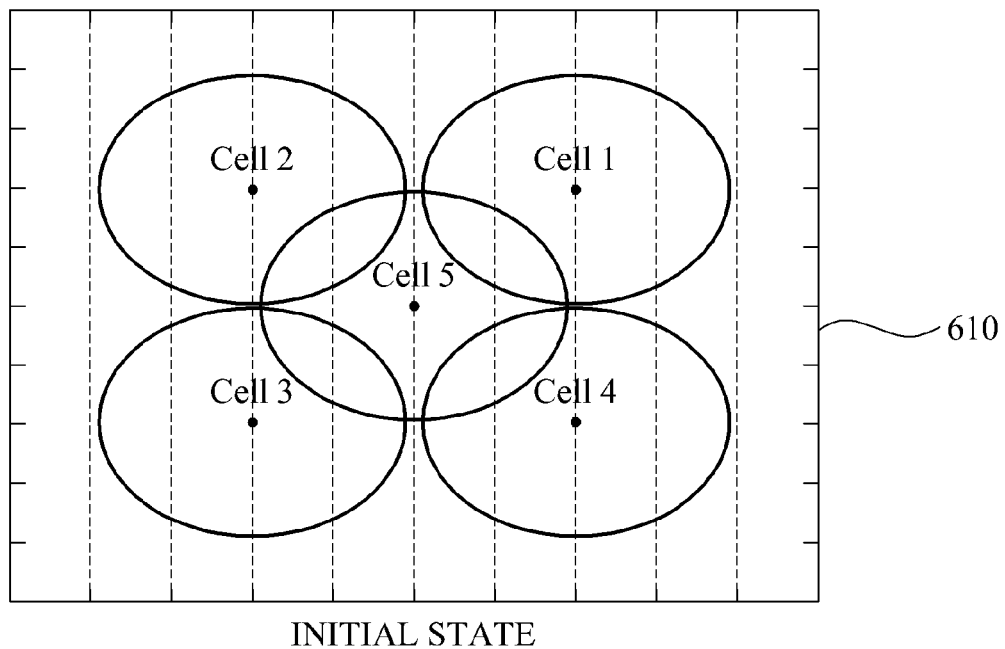
FIG. 6 is a diagram illustrating an example of a result that a cell coverage is controlled when a base station is idle.
Figure 6:
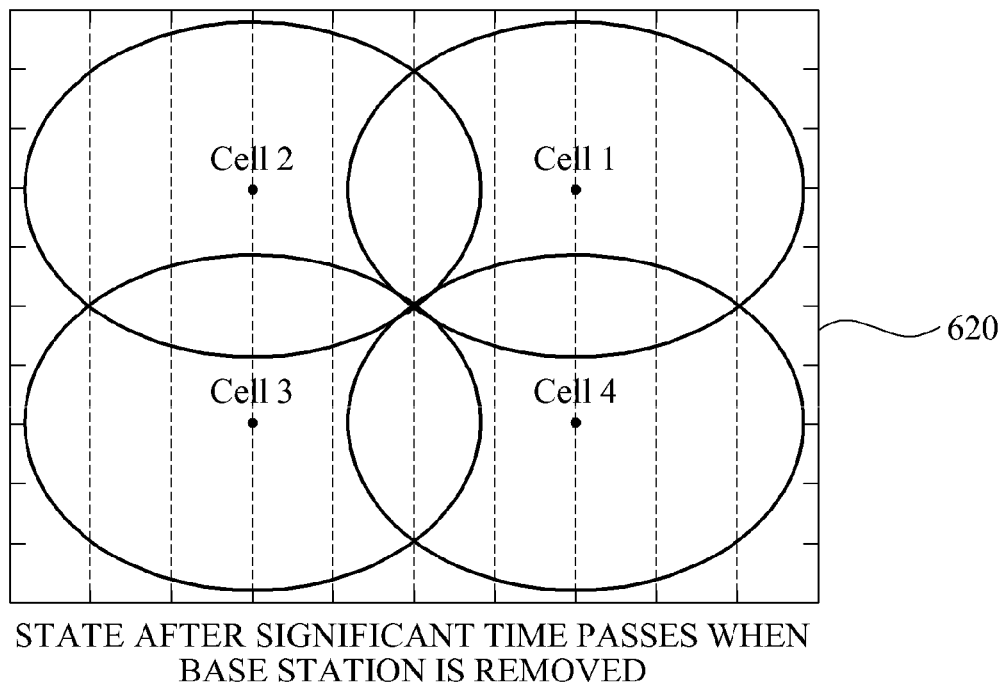

FIG. 6 is a diagram illustrating an example of a result that a cell coverage is controlled when a base station is idle.

Referring to FIG. 6, a graph 610 depicts cell coverages of cells 1, 2, 3, 4, and 5 in an initial state. In this instance, when a base station corresponding to cell 5 becomes an idle node, cell coverages of cells 1, 2, 3, and 4 are controlled.

Another graph 620 depicts a state after a significant time passes when the cell coverages of cells 1, 2, 3, and 4 are controlled when a base station corresponding to cell 5 becomes the idle node. That is, the cell coverages of cells 1, 2, 3, and 4 are increased in comparison to a state before the base station corresponding to cell 5 is removed, thereby compensating for a cell coverage of the removed cell 5.

Consequently, the cell coverages of cells 1, 2, 3, and 4 are increased and stabilized in order to compensate for the cell coverage of cell 5.

The method of controlling a cell coverage according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, it is possible to effectively control a cell coverage since a cell coverage of a target cell is controlled by considering a cell coverage of an adjacent node.

Also, according to the present invention, it is possible to evenly distribute a traffic load to each cell since a cell coverage is controlled by considering a traffic load of an adjacent node.

Also, according to the present invention, it is possible to effectively control a cell coverage since state information being capable of simultaneously considering both the cell coverage and a traffic load is newly defined.

Also, according to the present invention, it is possible to control a cell coverage since a substantial wireless environment is considered by calculating a traffic load by giving a weighted value to each quality of service (QoS).

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A system of controlling a cell coverage, the system comprising:
   a state information generation unit configured to generate state information by considering at least one of a cell coverage and a traffic load of a target cell;
   an adjacent state information identification unit configured to identify adjacent state information, which is generated by considering at least one of a cell coverage and a traffic load of an adjacent node, from at least one adjacent node; and
   a cell coverage control unit configured to control the cell coverage of the target cell, based on the state information and the adjacent state information.

2. The system of claim 1, wherein the cell coverage control unit is further configured to:
   calculate average state information with respect to the state information and the adjacent state information; and
   control the cell coverage of the target cell by considering the state information based on the calculated average state information.

3. The system of claim 2, wherein, in response to a difference between the state information and the average state information being greater than or equal to a predetermined level, the cell coverage control unit is further configured to:
   decrease the cell coverage of the target cell in response to the state information being a higher level than the average state information; and
   increase the cell coverage of the target cell in response to the state information being a lower level than the average state information.

4. The system of claim 2, wherein, in response to the difference between the state information and the average state information being less than a predetermined level, the cell coverage control unit is further configured to control the cell coverage of the target cell by considering a number of handover performances of a moving node that occurs within the cell coverage of the target cell, or a coverage gap that occurs between the cell coverage of the target cell and the cell coverage of the adjacent node.

5. The system of claim 1, wherein the cell coverage control unit is further configured to control the cell coverage of the target cell to balance the state information and the adjacent state information by using the state information and the adjacent state information.

6. The system of claim 1, wherein, in response to an idle node existing, the cell coverage control unit is further configured to increase the cell coverage of the target cell by considering state information of the idle node, the idle node being one of the at least one adjacent node.

7. The system of claim 1, wherein the state information generation unit is further configured to generate the state information by multiplying cell coverage information associated with the cell coverage of the target cell and traffic information associated with the traffic load.

8. The system of claim 1, further comprising a state information advertisement unit configured to advertise the state information to the at least one adjacent node by considering the controlled cell coverage of the target cell.

9. The system of claim 1, wherein the amount of the traffic load is calculated by giving a weighted value to each quality of service (QoS).

10. The system of claim 1, further comprising a state information updating unit configured to update the state information of the target cell by considering the controlled cell coverage of the target cell.

11. A method of controlling a cell coverage, the method comprising:
    generating state information by considering at least one of a cell coverage and a traffic load of a target cell;
    identifying adjacent state information, which is generated by considering at least one of a cell coverage and a traffic load of an adjacent node, from at least one adjacent node; and
    controlling the cell coverage of the target cell based on the state information and the adjacent state information.

12. The method of claim 11, wherein the controlling of the cell coverage of the target cell comprises:
    calculating average state information with respect to the state information and the adjacent state information; and
    controlling the cell coverage of the target cell by considering the state information based on the calculated average state information.

13. The method of claim 12, wherein, in response to a difference between the state information and the average state information being greater than or equal to a predetermined level, the controlling of the cell coverage of the target cell comprises:
    decreasing the cell coverage of the target cell in response to the state information being a higher level than the average state information; and
    increasing the cell coverage of the target cell in response to the state information being a lower level than the average state information.

14. The method of claim 12, wherein, in response to the difference between the state information and the average state information being less than a predetermined level, the controlling of the cell coverage of the target cell comprises controlling the cell coverage of the target cell by considering a number of handover performances of a moving node that occurs within the cell coverage of the target cell, or a coverage gap that occurs between the cell coverage of the target cell and the cell coverage of the adjacent node.

15. The method of claim 11, wherein the controlling of the cell coverage of the target cell comprises controlling the cell coverage of the target cell to balance the state information and the adjacent state information by using the state information and the adjacent state information.

16. The method of claim 11, further comprising advertising the state information to the at least one adjacent node by considering the controlled cell coverage of the target cell.

17. The method of claim 11, further comprising updating the state information of the target cell by considering the controlled cell coverage of the target cell.

18. At least one computer-readable storage medium storing instructions for implementing the method of claim 11.

* * * * *